United States Patent [19]
Proctor et al.

[11] 3,944,753
[45] Mar. 16, 1976

[54] APPARATUS FOR DISTINGUISHING VOICE AND OTHER NOISE SIGNALS FROM LEGITIMATE MULTI-FREQUENCY TONE SIGNALS PRESENT ON TELEPHONE OR SIMILAR COMMUNICATION LINES

[75] Inventors: Darryl F. Proctor, Redmond; Peter T. Skelly, Issaquah; Louis W. Champan, Kent, all of Wash.

[73] Assignee: Proctor & Associates Company, Redmond, Wash.

[22] Filed: Oct. 31, 1974

[21] Appl. No.: 519,432

[52] U.S. Cl. ............................... 179/84 VF; 179/1 P
[51] Int. Cl.² ........................................... H04M 1/00
[58] Field of Search ............ 179/1 SA, 1 HF, 84 VF

[56] References Cited
UNITED STATES PATENTS

| | | | |
|---|---|---|---|
| 3,851,112 | 11/1974 | Kusan | 179/84 VF |
| B349,948 | 1/1975 | O'Neill | 179/84 VF |

FOREIGN PATENTS OR APPLICATIONS

| | | |
|---|---|---|
| 1,159,517 | 12/1963 | Germany |

OTHER PUBLICATIONS

Beeman, "Improved Multi-frequency Receiver," IEEE Transactions, Comm. Tech., June 1970.

*Primary Examiner*—William C. Cooper
*Assistant Examiner*—E. S. Kemeny
*Attorney, Agent, or Firm*—Christensen, O'Connor, Garrison & Havelka

[57] ABSTRACT

In order to distinguish voice and other noise signals which may be present on telephone or similar communications lines from legitimate multi-frequency tone data and control signals, three detectors are disclosed. A frequency drop detector is provided which receives an input from the lines and which provides an output signal upon receipt of any signals appearing on the lines which terminates when the frequency thereof rapidly drops by a predetermined amount. Means consisting of a long-time interval detector are provided for investigating the status of the frequency drop detector's output for a predetermined time after the production of said output signal. If the output signal from said frequency drop detector is provided throughout said predetermined time period, the signal on the lines is defined as legitimate and a circuit output signal is produced. In all other cases, the circuit output signal is inhibited. In a telephone communications application where audible twin-tone signals are present along with voice and other noise signals, first and second frequency drop detectors are provided for the high and low frequency groups making up such twin-tone signals. Also, a frequency coincidence detector is provided which provides an output signal only when the components of the signals in both the high and the low groups do not have the same frequency. In this embodiment, the presence of all of the output signals so described for a period of time equal to or greater than that established causes an output to be produced which signifies that the signals are not likely voice or other noise signals.

12 Claims, 2 Drawing Figures

APPARATUS FOR DISTINGUISHING VOICE AND OTHER NOISE SIGNALS FROM LEGITIMATE MULTI-FREQUENCY TONE SIGNALS PRESENT ON TELEPHONE OR SIMILAR COMMUNICATION LINES

FIELD OF THE INVENTION

This invention generally relates to the field of communications, and, more particularly, to an apparatus for distinguishing voice and other noise signals from legitimate data and control signals present on telephone or similar communications lines.

BACKGROUND OF THE INVENTION

In communications systems, it is often desirable to be able to distinguish between legitimate control or data signals and noise signals which possess some of the same characteristics as the legitimate data or control signals. In the particular case of a telephone communications system where such data and control signals are in the audible range, it is necessary to discriminate against noise signals appearing on a pair of telephone lines, which noise signals may be formed in one instance by human voices and hereinafter referred to as voice signals.

The prior art demonstrates many techniques and apparatus for detecting legitimate data and control signals and for rejecting noise signals. Such techniques and apparatus generally inhibit the operation of associated equipment from receiving and acting upon the noise signals until such time as legitimate data and control signals are received.

The present invention is an improvement on the prior art in that it positively inhibits the operation of associated equipment when noise signals are received, even though those noise signals may have certain characteristics which are common with legitimate data or control signals.

Therefore, it is an object of this invention to provide an apparatus for detecting voice and other noise signals present on telephone or similar communications lines.

It is a further object of this invention to provide such an apparatus which inhibits the production of an output signal therefrom within a very short period of time following the first occurrence of such voice or other noise signals on the lines.

It is still a further object of this invention to provide an apparatus which does not respond to voice and other noise signals which may have one characteristic which is common with legitimate data and control signals appearing on a communications line.

It is yet a further object of this invention to provide such an apparatus which responds only to legitimate data and control signals on the lines.

SUMMARY OF THE INVENTION

These objects and others are realized in one embodiment of the invention by the provision of a frequency drop detector connected to the lines on which legitimate data and control signals, and voice and other noise signals, are to appear. Upon the occurrence of any signal on the lines, the frequency drop detector provides an output, which output terminates only if the frequency of that signal rapidly drops by a predetermined amount. The production of the output signal from the frequency drop detector initiates a timing period. Throughout and at the end of this timing period, if the frequency drop detector is still providing an output signal, the signal on the lines is defined as legitimate and a circuit output signal is provided from the apparatus. On the other hand, if the frequency drop detector terminates its output signal at any time during this time period, the signal on the lines is defined as a noise signal and no circuit output signal is provided.

In this embodiment, if the frequency drop detector again provides an output, the timing period is re-initiated.

When the invention is used in conjunction with a telephonic communications system having tone signals having more than one frequency component, a plurality of frequency drop detectors are included, one such detector being provided for each group of frequencies comprising a component of the tone signal. In such a case, the provision of an output signal throughout and at the end of the timing period by all of the plurality of frequency drop detectors allows the production of a circuit output signal, signifying reception of a legitimate signal. A frequency coincidence detecting means may also be provided for inhibiting the production of the output signal whenever the same frequency appears in both groups of the signals.

The invention also contemplates the use of a frequency rise detector by itself or in combination with a frequency drop detector so that noise signals including frequency increases can be detected.

BRIEF DESCRIPTION OF THE DRAWINGS

The invention can best be understood by consideration of the following specification taken in conjunction with the accompanying drawings in which.

DESCRIPTION OF A PREFERRED EMBODIMENT

Although the invention will hereinafter be described with reference to its application in a telephonic communications system in which data and control signals comprise tone signals, it is to be understood by those skilled in the art that the invention is not limited thereto and indeed finds applicability in any communications system in which it is desired to positively identify noise signals having at least one characteristic common with legitimate data and control signals.

In the typical telephonic communications system, data and control signals are in the form of twin-tone signals. The frequencies used for twin-tone signals are arranged in two groups, a "low" group in which the standard frequencies are 697 Hz, 770 Hz, 852 Hz and 941 Hz, and a "high" group in which the standard frequencies are 1209 Hz, 1336 Hz, 1477 Hz and 1633 Hz. A decimal digit used for data and control purposes in such telephonic communications systems is signified by the pairing of a frequency from each group into a composite tone signal. For example, the decimal digit "1" is a composite signal having the components 697 Hz and 1209 Hz.

It is well known that data and control signals in telephonic communication systems of the type described above have certain defined characteristics, some of which are (a) a substantially constant frequency after an initial frequency rise, and (b) a relatively constant amplitude.

Now, it can be noted that the frequencies in both the high and low groups are in the audible range. As a result, noise signals in the audible range, such as may be created by voice communications or other sources, are difficult to distinguish from legitimate data and control signals. However, there are certain other characteristics of noise signals in telephonic communications systems which distinguish them from legitimate data and control signals and which can advantageously be used to detect such noise signals. For example, although the noise signals may have at some point frequency components which are within the ranges of the high and the low groups, it is unlikely that such frequency components will be stable in frequency over a predetermined period of time greater than the initial period of frequency instability of a legitimate signal. Finally, certain noise signals, such as those caused by a high amplitude whistle, will cause the pass-band filters in both the high and low groups to pass the same frequency.

In the present invention, one or more of these distinguishing characteristics is utilized to provide a positive indication of the detection of a noise signal.

Figure 1:
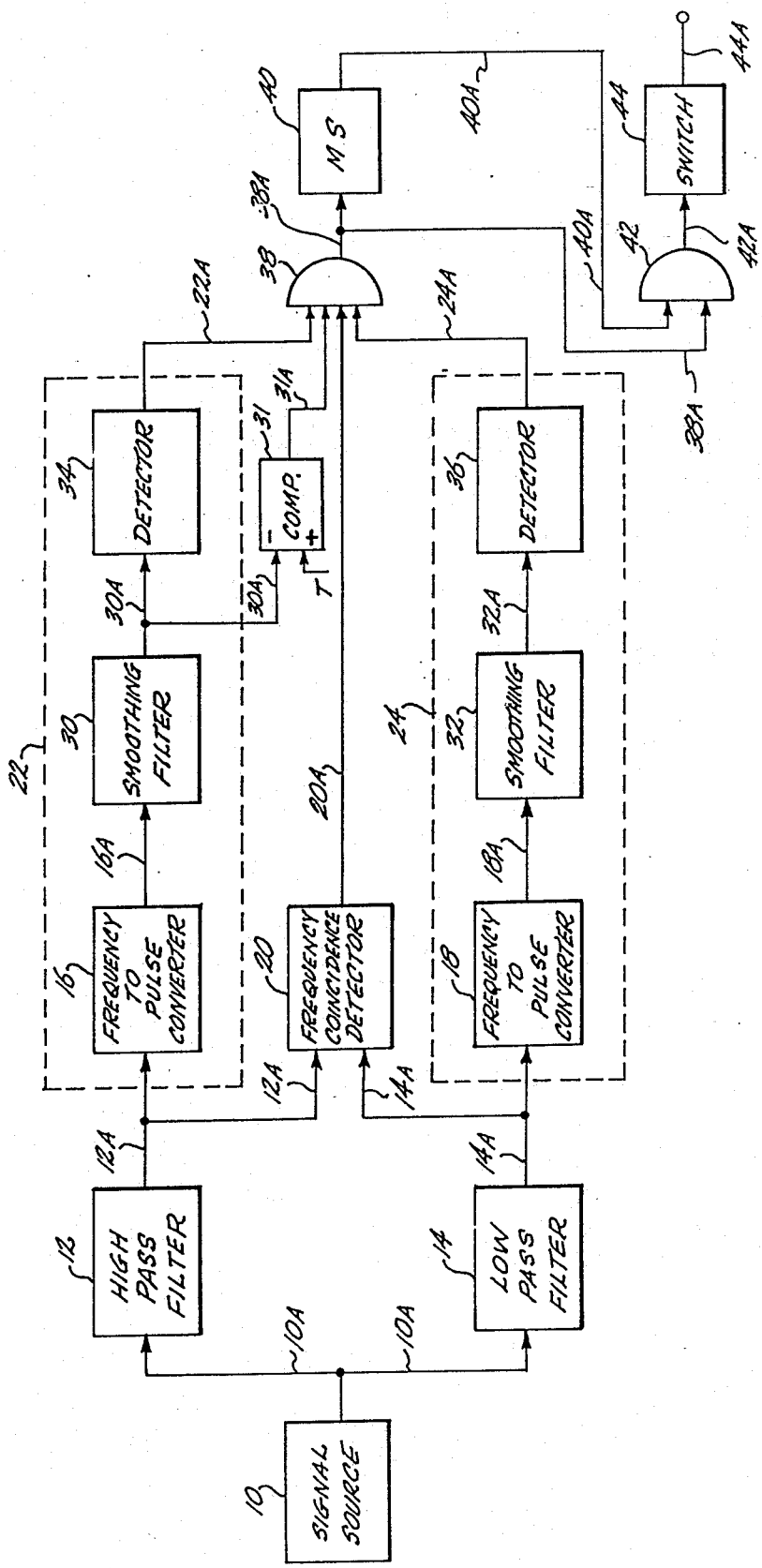
FIG. 1 is a block diagram illustrating a preferred embodiment of the invention useful in telephonic communications systems.

Now turning to FIG. 1, legitimate data and control signals, as well as voice and other noise signals, appear on a line 10A and are shown schematically as emanating from a signal source 10, which may in fact be a connector circuit which connects line 10A to a pair of telephone lines, or which in fact may be any other input circuit having connected thereto a line or lines on which data, control and noise signals appear.

The signals on line 10A are, in the present embodiment, supplied to both a high-pass filter 12 and to a low-pass filter 14. High-pass filter 12 and low-pass filter 14 are standard components in telephony and operate to provide at their outputs 12A, 14A signals containing frequency components in the high and low frequency groups, respectively.

The signals on lines 12A and 14A are typically alternating current signals whose waveform is determined by the characteristics of the signals on line 10A. In the case of legitimate data and control signals, this waveform is sinusoidal.

The signals on line 12A are supplied to the input of a frequency drop detector 22, and, more specifically, to the input of a frequency-to-pulse converter 16 within frequency drop detector 22. Likewise, the signals on line 14A are supplied to the input of a frequency drop detector 24, and, more particularly, to the input of a frequency-to-pulse converter 18 within frequency drop detector 24. The signals on lines 12A and 14A are also supplied to the inputs of a frequency coincidence detector 20.

Both frequency drop detector 22 and frequency drop detector 24 operate to provide an output signal on lines 22A, 24A, respectively, only if the frequency of the signals presented on input lines 12A, 14A, respectively, does not rapidly drop by a predetermined amount.

With reference now only to frequency drop detector 22, the signals on line 12A are converted by frequency-to-pulse converter 16 into a signal on line 16A whose average value is proportional to the frequency of the signals on line 12A. Such frequency-to-pulse converters are well known and may include, as hereinafter described with respect to FIG. 2, a retriggerable monostable multivibrator providing an output pulse of fixed duration for every crossing of the magnitude of the signals on line 12A past a reference value.

The average value of the signal on line 16A is extracted by a smoothing filter 30 which provides an output on line 30A which comprises a DC voltage proportional to the average value and therefore to the frequency of the signals on line 12A.

The DC voltage on line 30A is supplied to one input of a detector 34. The detector 34 includes means for establishing a minimum frequency drop for frequency detector 22. Detector 34 functions to provide an output signal on line 22A upon the receipt of a signal on line 30A, which output signal terminates only when the magnitude of the DC voltage on line 30A rapidly drops by a predetermined amount. The voltage drop, and the value of the frequency drop thus established by detector 34 is not critical. As hereinafter explained with respect to FIG. 2, detector 34 may comprise a comparator which terminates its output signal when the magnitude of the voltage on line 30A rapidly drops by an amount equal to the forward voltage drop of a diode. In the case of silicon diodes, this forward voltage drop is approximately 0.6 volts.

The rapidity of the frequency change necessary to cause an output from detector 34 is also not critical, and may be empirically determined, together with the value of the frequency drop, so that detector 34 is not likely to terminate its output signal due to normal instability in the frequency of a legitimate data or control signal. As explained hereinafter with respect to FIG. 2, detector 34 may further comprise a capacitor whose charge time is shorter than its discharge time. This difference in charge-discharge times is relied upon to provide an indication of the rapidity of the frequency decrease.

Since the high-pass filter 12 passes not only frequencies in the high group, but also frequencies above the highest standard frequency in the high group, or 1633 Hz, the DC voltage on line 30A is also supplied to one input of a comparator 31 which has as a second input a threshold signal T. Comparator 31 normally provides an output signal and terminates that output signal only when the magnitude of the DC voltage on line 30A exceeds a value established by the threshold signal T which represents some frequency higher than 1633 Hz. In such a case, the signals on line 12A can be defined as noise in having a frequency above the recognized band of the high frequency group.

Frequency drop detector 24 includes the aforementioned frequency-to-pulse converter 18 which operates in a manner identical to frequency-to-pulse converter 16 and which provides an output on line 18A whose average value is proportional to the frequency of the signals on line 14A. A smoothing filter 32 extracts this average value and converts it into a corresponding DC voltage on line 32A which is supplied to an input of a detector 36. Detector 36 operates in a manner identical to detector 34 and terminates its output signal on line 24A only when the magnitude of the DC signal on line 32A rapidly drops by a predetermined amount.

Frequency coincidence detector 20 functions to normally provide an output signal on line 20A upon the receipt of signals on lines 12A and 14A and to terminate that output signal only if the frequency components of the signals on lines 12A and 14A are identical. Frequency coincidence detectors of this type are well known in the art and may comprise, as described hereinafter with respect to FIG. 2, bidirectional shift register.

The output signals on lines 22A, 31A, 20A and 24A are supplied to respective inputs of a gating means symbolized in FIG. 1 as an AND gate 38. Accordingly, AND gate 38 provides an output signal on line 38A only upon the presence of an output signal on all of the lines 22A, 31A, 20A, and 24A. The output signal on line 38A is supplied to a timing means including, in FIG. 1, a retriggerable monostable multivibrator 40 whose output 40A is connected to an input of a second gating means symbolized in FIG. 1 as an AND gate 42 which also receives an input from the output of AND gate 38 on line 38A. Upon the occurrence of an output signal on line 38A, retriggerable monostable multivibrator 40 begins its predetermined time period and provides an output signal on line 40A at the end of such predetermined time period. This predetermined time period may be chosen to be longer than the expected initial period of frequency instability of legitimate and data control signals. In a working model, the predetermined time period was 50 milliseconds.

When monostable multivibrator 40 provides its output signal on line 40A at the end of the predetermined time period, it will be noted that AND gate 42 provides an output on line 42A only if an output signal is at that time being provided by AND gate 38 on line 38A. It will thus be seen that (a) a rapid drop in frequency of the signals on line 12A by a predetermined amount, or (b) a rise in frequency of the signals on line 12A above the value established by threshold signal T, or (c) a rapid drop in frequency of the signals on line 14A by a predetermined amount, or (d) a frequency coincidence between the signals on lines 12A and 14A, occurring during or at the end of the predetermined time period established by monostable multivibrator 40 will inhibit the production of an output signal from AND gate 38 and thus inhibit the production of an output signal from AND gate 42 on line 42A. Further, if any of the output signals terminate and then reappear during the predetermined time period, monostable multivibrator is again triggered and restarts its predetermined time period. Therefore, only when none of the aforementioned conditions (a) – (d) occur over the predetermined time period will an output signal be provided on line 42A which signifies that voice or other noise signals are not likely present on input line 10A. Line 42A is connected to the input of a switch 44 which provides a circuit output signal on line 44A in response to the occurrence of an output signal on line 42A, signifying that voice or other noise signals are not likely present.

Figure 2:
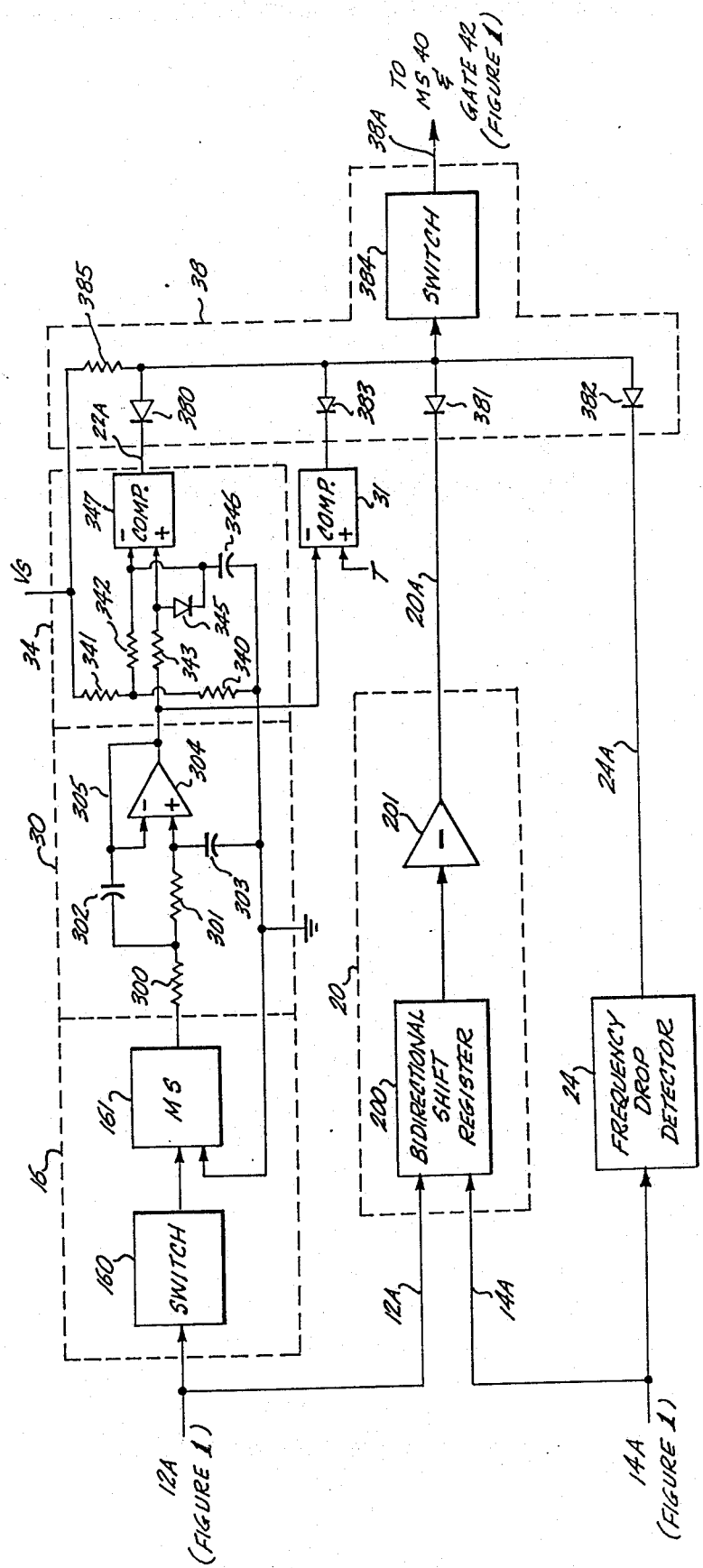
FIG. 2 is a combined block and schematic diagram showing in detail certain elements of the preferred embodiment shown in FIG. 1.

Now turning to FIG. 2, the components of frequency drop detector 22, frequency coincidence detector 20, and AND gate 38 will be described in more detail. In FIG. 2, the elements which also appear in FIG. 1 have been identified with like numerals.

The frequency-to-pulse converter 16 is seen to comprise a switch 160 which receives its input from line 12A and which functions to provide a rectangular output waveform whose frequency is related to that of the signals on line 12A. Switch 160 may also include a level detection circuit, not illustrated, which blocks operation of switch 160 for low-amplitude noise signals.

The output of switch 160 is supplied to the input of a retriggerable monostable multivibrator 161 which is also supplied with a reference signal from ground. Accordingly, monostable multivibrator 161 functions to provide an output pulse having a predetermined magnitude and a predetermined duration for each transition of the output signal from switch 160 past the reference level. In essence, the monostable multivibrator 161 functions as a zero crossing detector and pulse generator. The result is a train of unidirectional output pulses of predetermined magnitude and duration whose rate of occurrence is determined by the frequency of the output signal from switch 160, and accordingly, by the frequency of the signals on line 12A. As is well known, the average value of this pulse train is proportional to the frequency of the signals on line 12A.

The smoothing filter 30 is seen to comprise a resistor 300 and a resistor 301 connected in series between the output of monostable multivibrator 161 and the positive input of an operational amplifier 304. A capacitor 303 is connected from the positive input of operational amplifier 304 to ground. A capacitor 302 is connected from the common junction of resistors 300 and 301 to the negative input of operational amplifier 304 and a feedback connection is provided between the output of operational amplifier 304 and the negative input thereof by a lead 305.

The smoothing filter 30 so illustrated in FIG. 2 is of conventional design and functions to provide a DC voltage at the output of operational amplifier 304 which is related in magnitude to the average value of the output pulse train from monostable multivibrator 161.

The detector 34 is seen in FIG, 2 to comprise a resistor 343 which is connected in series between the output of operational amplifier 304 and a positive input of a comparator 347. A diode 345 is connected in a forward conduction direction from the common junction of resistor 343 and the positive input of comparator 347 to a negative input of comparator 347. A capacitor 346 is connected from the negative input of comparator 347 to ground. Series-connected resistors 341 and 340 are connected from a positive power supply $V_s$ to ground and the common junction thereof is connected by a resistor 342 to the negative input of comparator 347. The resistor network including resistors 341, 340 and 342 impose a threshold voltage on the negative input of comparator 347 which must be exceeded by the voltage on the output of amplifier 304 before comparator 347 can provide a logic 1 or high output. This threshold voltage is desirable to avoid actuation of comparator 347 in response to low frequency noise signals. The output of comparator 347 comprises the output line 22A of the frequency drop detector 22.

Normally, comparator 347 provides a logic 0 or low signal on output line 22A. Upon the occurrence of a voltage on the output of amplifier 304, capacitor 346 is rapidly charged to some value related to the magnitude of the voltage on output of amplifier 304 through resistor 343 and diode 345. The voltage across capacitor 346 is accordingly present at the negative input of comparator 347. Since diode 345 is connected in a forward conduction direction, the only discharge path for capacitor 346 is through the high input impedance of comparator 347 or through the resistive network including resistors 342, 341 and 340. As a result, capacitor 346 discharges at a much slower rate than it charges.

The voltage across capacitor 346, and accordingly the voltage presented to the negative input of comparator 347, is therefore always closely related to the magnitude of the DC voltage from amplifier 304, and therefore to the frequency of the signal present on line 12A, as long as that DC voltage is stable or is increasing. However, if the DC voltage decreases in value the voltage presented to the negative input of comparator 347 remains at the previous peak level.

It will also be noted that comparator 347 provides a logic 0 or low signal on its output 22A only when the magnitude of the signal on its negative input exceeds the magnitude of the signal on its positive input. As long as the magnitude of the DC voltage from amplifier 304 is relatively stable, the comparator 347 provides an output which is a logic 1 or high signal inasmuch as the negative input thereof has a signal applied thereto which is lower in magnitude than the signal applied to the positive input thereof by an amount equal to the forward voltage drop of the diode 345. However, when the magnitude of the DC voltage from amplifier 304 drops as previously described, the signal applied to the positive input of comparator 347 also drops but the signal applied to the negative input of comparator 347 does not so drop due to the slow discharge time of capacitor 346. When the magnitude of the DC voltage from amplifier 304 drops by an amount equal to the forward voltage drop of diode 345 in a time less than is needed for capacitor 346 to discharge by such an amount, comparator 347 will provide a logic 0 signal on line 22A.

The AND gate 38 is seen in FIG. 2 to include a plurality of diodes 380, 381, 382 and 383 connected in a reverse conduction direction from the leads 22A, 20A, 24A, and 31A, respectively, to the input of a switch 384. When the signal on any one of the lines 22A, 20A, 24A or 31A goes to a logic 0 or a low level, the associated diode 380, 381, 382 or 383 conducts and provides an input signal to inhibit switch 384 from providing an output signal on line 38A.

The component elements 18, 32 and 36 of frequency drop detector 24 may be similar in construction to the component elements 16, 30 and 34 of frequency drop detector 22 illustrated in FIG. 2 and accordingly are not illustrated or discussed herein.

The frequency coincidence detector 20 is seen in FIG. 2 to include a bidirectional shift register 200 which receives its inputs from the signals on lines 12A and 14A. The signals on lines 12A cause the bidirectional shift register to shift a data bit from a center position thereof in one direction through a predetermined number of intermediate stages to a first output stage, and the signals on line 14A cause the bidirectional shift register 200 to shift that data bit in an opposite direction through a predetermined number of intermediate stages to a second output stage. The output of bidirectional shift register 200 comprises a logic 0 signal when the data bit is shifted to either the first or second output stages. At all other times, the output of bidirectional shift register 200 comprises either a logic 1 or a logic 0 with the transitions between the logic 1 and the logic 0 output signals being made at the occurrence of each shifting operation.

Accordingly, if the signals on lines 12A and 14A are of different frequencies, bidirectional shift register 200 shifts the data bit to either the first or second output stage and the output thereof is a logic 0. If, however, the signals on lines 12A and 14A have the same frequency, the bidirectional shift register 200 has alternating logic 1 and logic 0 output signals.

The output of bidirectional shift register 200 is supplied to the input of an inverting amplifier 201, which accordingly provides a logic 1 output on output line 20A in the case where the signals on lines 12A and 16A are of different frequencies. In the case where they are not, the logic 1 outputs of bidirectional shift register 200 are amplified and inverted by inverting amplifier 201 and are presented as a logic 0 output signal on line 20A to inhibit switch 384 through diode 381 from providing an output signal on line 38A.

Those skilled in the art will readily recognize that the invention also includes the provision of one or more frequency rise detectors either in combination with or as a substitute for frequency drop detectors 22, 24. For example, a frequency rise detector can be responsive to terminate an output signal to the gating means including AND gate 38 when the frequency of the signals on line 12A increases by a predetermined amount. Those skilled in the art will also recognize that such a frequency rise detector can include elements similar to those of the frequency drop detector 22 illustrated and described with respect to FIGS. 1 and 2, with the additional element of an inverter interposed in the line 30A between the output of smoothing filter 30 and the input of detector 34. Therefore, it is to be understood that the limits of the present invention are to be set only by the limits of the appended claims.

What is claimed is:

1. An apparatus for detecting when signals appearing on a communications line do not contain voice or other noise signals, comprising:
   a. detector means coupled to the communications line for providing a first output signal which is initiated whenever signals appear on the communications line and which is terminated only when the signals on the communications line rapidly undergo a variation in frequency exceeding a predetermined amount,
   b. timing means coupled to said detector means for providing a second output signal at a predetermined time after said first output signal is initiated by said detector means, and
   c. gating means coupled to said detector means and to said timing means and providing a third output signal upon the concurrence of said first and second output signals.

2. An apparatus as recited in claim 1, wherein said detector means comprises a frequency drop detector terminating said first output signal whenever the frequency of the signals on the communications line decreases by a predetermined amount.

3. An apparatus as recited in claim 2, wherein said frequency drop detector includes
   a. means converting the frequency of the signals on the communications line into a first signal whose magnitude is related thereto,
   b. means providing a second signal having a predetermined value, and
   c. a detector terminating said first output signal when the magnitude of said first signal rapidly decreases by an amount equal to that of said second signal.

4. An apparatus as recited in claim 3, wherein said converting means includes a frequency-to-pulse converter providing a third signal comprising a train of constant amplitude, constant width, unidirectional pulses whose repetition rate is related to the frequency of the signals on the communications line, and filter means coupled to said third signal for extracting the average value of said pulse train to obtain said first signal.

5. An apparatus as recited in claim 4, wherein said means providing a second signal comprises a diode whose forward conduction voltage establishes said predetermined value.

6. A circuit which discriminates against voice and other noise signals appearing on a pair of telephone lines, said circuit having an input for connection to the pair of telephone lines and an output, and including a. a first frequency change detection means having an input connected to said circuit input and an output, and operative to provide a first signal on its output which is initiated whenever signals are present on the pair of telephone lines and operative to terminate said first signal whenever the signals rapidly undergo a variation in frequency exceeding a predetermined amount, b. timing means having an input connected to the output of said first frequency change detection means and an output, said timing means being operative to provide a second signal on its output at a predetermined time after said first signal is initiated by said first frequency change detection means, and c. first gating means having first and second inputs connected to the outputs of said frequency change detection means and said timing means, respectively, and an output connected to said circuit output, and operative to provide a third signal on its output at the concurrence of said first and said second signals.

7. A circuit as recited in claim 6 for use where legitimate twin-tone signals are present on the pair of telephone lines, each said legitimate twin-tone signal being formed from first and second frequency components, said first frequency component being selected from a first group of frequencies and said second frequency component being selected from a second group of frequencies, said first and said second groups lacking common frequencies, and further including:

a. first and second filter means, each having an input and an output, the inputs of said first and said second filter means being connected to said circuit input, the output of said first filter means being connected to the input of said first frequency change detection means, and said first filter means passing to its output only those frequencies substantially within said first group of frequencies, b. a second frequency change detection means having an input and an output, and operative to provide a fourth signal on its output which is initiated whenever signals are provided to its input and operative to terminate said fourth signal whenever said signals rapidly undergo a variation in frequency exceeding a predetermined amount, the output of said second filter means being connected to the input of said second frequency change detection means, said second filter means passing to its output only those frequencies substantially within said second group of frequencies, c. a second gating means having first and second inputs and an output, said first input being connected to said output of said first frequency change detection means and said second input being connected to said output of said second frequency detection means, said second gating means output being connected to the input of said timing means and said first gating means in place of the output from said first frequency change detection means, said second gating means being operative to provide a fifth signal on its output at the concurrence of said first and fourth signals, and d. wherein said timing means is responsive to said fifth signal and said first gating means is operative to provide said third signal at the concurrence of said fifth and second signals.

8. A circuit as recited in claim 7, further including frequency coincidence detection means having first and second inputs connected to the outputs of said first and said second filter means, respectively, and an output, and operative to provide a sixth signal on its output upon the presence of signals on its inputs and operative to terminate said sixth signal only when the signals on the outputs of said first and said second filter means have the same frequency, and wherein said second gating means further includes a third input connected to the output of said frequency coincidence detection means and wherein said second gating means is further operative to provide said fifth signal on its output at the concurrence of said first, fourth, and sixth signals.

9. A circuit as recited in claim 6, wherein said timing means includes a retriggerable monostable multivibrator which is reset to initiate said predetermined time upon each occurrence of said first signal.

10. A circuit for use in detecting voice and other noise signals having frequencies in the range of legitimate data and control signals appearing on a communications line, the frequencies of said voice and other noise signals being relatively unstable with respect to the frequencies of said legitimate data and control signals, comprising:

a. frequency-to-signal conversion means for converting the frequency of signals on the communications line into a signal whose magnitude is related thereto, and b. detection means responsive to a rapid change in said signal for providing an output signal signifying that voice and other noise signals are likely to be present on the communications line.

11. A circuit as recited in claim 10, wherein said detection means responds only to a rapid decrease in said signal.

12. A circuit as recited in claim 11, wherein said detection means comprises a capacitor, diode means for rapidly charging said capacitor by coupling said signal from said frequency-to-signal conversion means to said capacitor in a forward conduction direction, a comparator having first and second inputs and an output, means coupling said signal from said frequency-to-signal conversion means to said first input of said comparator, means coupling said capacitor to the second input of said comparator, and means for discharging said capacitor at a rate which is substantially lower than the rate of charge of said capacitor through said diode, said comparator providing said output signal on its output only when a magnitude of the signal on its first input is less than the magnitude of the signal on its second input.

* * * * *